(12) United States Patent
Franklin

(10) Patent No.: US 9,402,385 B2
(45) Date of Patent: Aug. 2, 2016

(54) WATERFOWL DECOY DEPLOYMENT APPARATUS

(71) Applicant: Mike Franklin, West Richland, WA (US)

(72) Inventor: Mike Franklin, West Richland, WA (US)

( * ) Notice: Subject to any disclaimer, the term of this patent is extended or adjusted under 35 U.S.C. 154(b) by 106 days.

(21) Appl. No.: 14/197,063

(22) Filed: Mar. 4, 2014

(65) Prior Publication Data

US 2014/0245652 A1    Sep. 4, 2014

Related U.S. Application Data

(60) Provisional application No. 61/772,490, filed on Mar. 4, 2013, provisional application No. 61/940,297, filed on Feb. 14, 2014.

(51) Int. Cl.
*A01M 31/06*    (2006.01)

(52) U.S. Cl.
CPC ..................... *A01M 31/06* (2013.01)

(58) Field of Classification Search
CPC ...................................... A01M 31/06
USPC ............... 43/2, 3; 40/411, 414; 446/236, 255; 472/6, 7, 10
See application file for complete search history.

(56) References Cited

U.S. PATENT DOCUMENTS

| | | | | |
|---|---|---|---|---|
| 1,722,922 A * | 7/1929 | Johnson | ................. | A63H 13/20 472/10 |
| 2,547,286 A * | 4/1951 | Sabin | .................... | A01M 31/06 43/3 |
| 2,575,252 A * | 11/1951 | Berger | .................. | A01M 29/06 40/417 |
| 2,726,469 A * | 12/1955 | Becker | .................. | A01M 31/06 43/3 |
| 2,787,074 A * | 4/1957 | Miller | .................... | A01M 31/06 43/3 |
| 3,191,930 A * | 6/1965 | Cottrell | .................... | A63G 1/30 472/6 |
| 3,762,702 A * | 10/1973 | Keele | ..................... | A63H 27/04 446/230 |
| 4,422,257 A * | 12/1983 | McCrory | .............. | A01M 31/06 43/3 |
| 4,925,182 A * | 5/1990 | Hou | ........................ | A63H 13/20 472/6 |
| 5,875,737 A * | 3/1999 | Boshears | ............. | A01K 15/025 119/706 |
| 6,079,140 A * | 6/2000 | Brock, IV | ............. | A01M 31/06 43/3 |
| 6,834,458 B1 * | 12/2004 | Hand, III | .............. | A01M 31/06 43/2 |
| 6,907,688 B2 * | 6/2005 | Brint | ..................... | A01M 31/06 40/417 |
| 7,043,865 B1 * | 5/2006 | Crowe | .................. | A01M 31/06 43/3 |
| 7,137,221 B2 * | 11/2006 | Highby | ................. | A01M 31/06 43/2 |

(Continued)

*Primary Examiner* — Darren W Ark
(74) *Attorney, Agent, or Firm* — Brian Beverly; Beeson Skinner Beverly, LLP

(57) ABSTRACT

A waterfowl decoy deployment apparatus comprises a drive wheel 82 having a vertical drive shaft 86 depending from a horizontal support plate 84, the drive shaft 86 rotatably locked in the drive shaft bore 80 of a reinforcement bearing 76 affixed to a housing 14, the motor shaft 58 from a motor 48 affixed to the housing 14 extending upwardly and rotatably secured in a motor shaft bore 90 in the lower end of the drive shaft 86, an array of waterfowl decoy deployment arms 18 radiating symmetrically and outwardly from the support plate 84, each waterfowl decoy deploying arm for supporting a waterfowl decoy, such that activation of the motor shaft 58 causes the drive wheel 82, bearing 76, and array of decoy deployment arms 18 to rotate in unison thereby deploying a plurality of decoys in a lifelike presentation.

12 Claims, 12 Drawing Sheets

(56) References Cited

U.S. PATENT DOCUMENTS

| | | | |
|---|---|---|---|
| 7,434,347 B1* | 10/2008 | Powell | A01M 31/06 43/3 |
| 7,536,823 B2* | 5/2009 | Brint | A01M 31/06 40/417 |
| 7,788,840 B2* | 9/2010 | Wyant | A01M 31/06 43/2 |
| 8,256,155 B1* | 9/2012 | Goodwill | A01M 31/06 43/3 |
| 8,484,883 B2* | 7/2013 | Rogers | A01M 31/06 43/2 |
| 8,950,103 B2* | 2/2015 | Bullerdick | A01M 31/06 43/2 |
| 2003/0196367 A1* | 10/2003 | Powell | A01M 31/06 43/3 |
| 2004/0237373 A1* | 12/2004 | Coleman | A01M 31/06 43/3 |
| 2015/0181861 A1* | 7/2015 | Butz | A01M 31/06 43/2 |

* cited by examiner

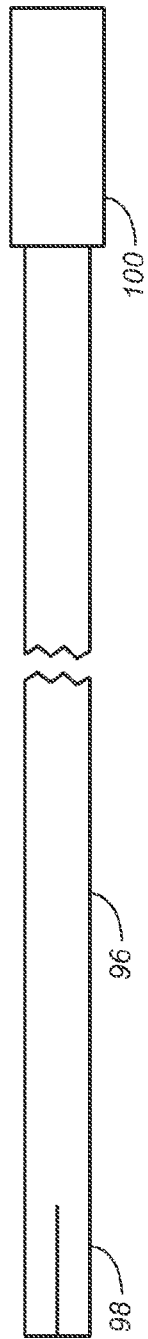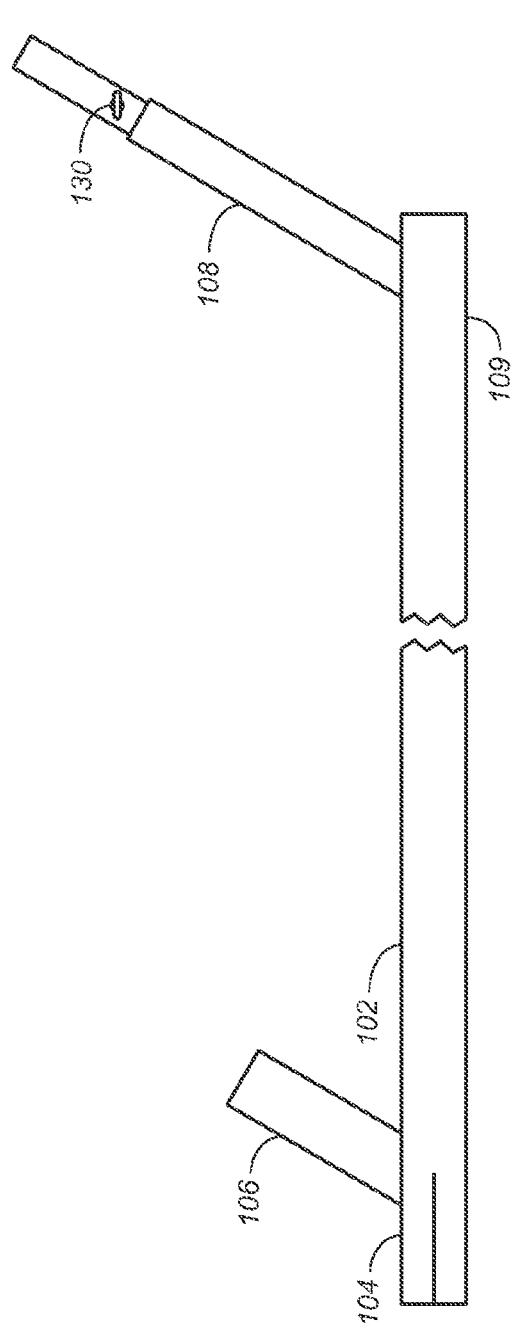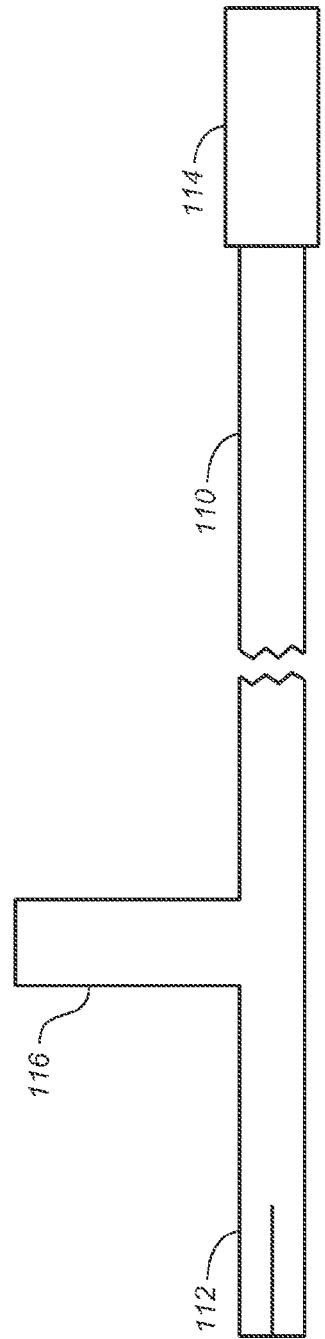
FIG. 9
FIG. 10
FIG. 11

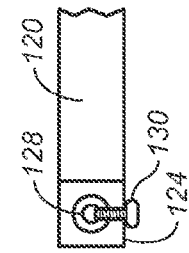
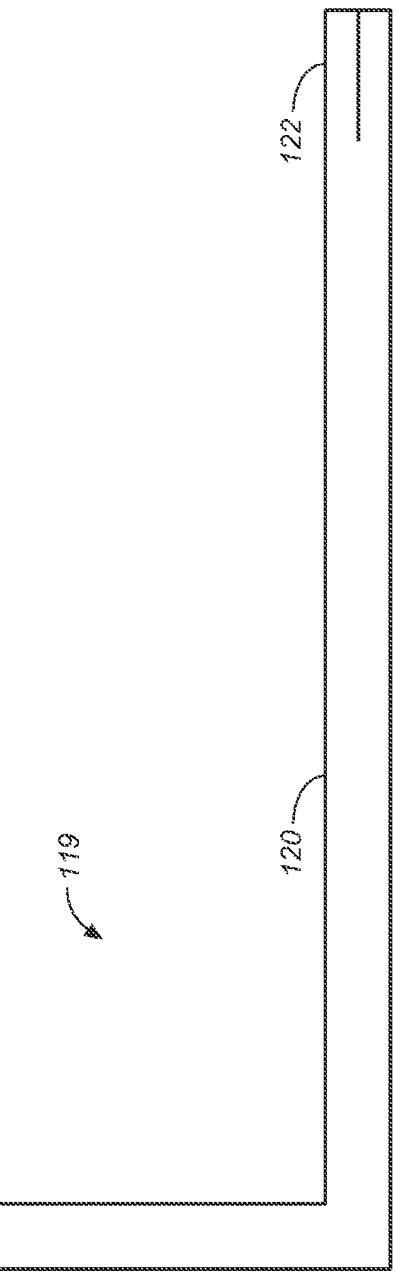
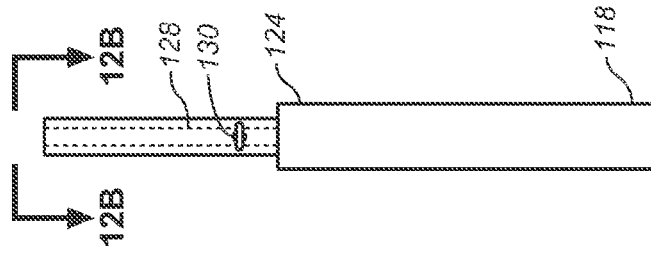

WATERFOWL DECOY DEPLOYMENT APPARATUS

CROSS-REFERENCE TO RELATED APPLICATIONS

This application claims the benefit of U.S. Provisional Application No. 61/772,490, filed Mar. 4, 2013, and U.S. Provisional Application No. 61/940,297, filed Feb. 14, 2014.

BACKGROUND

1. Field of the Invention

The invention relates to apparatuses for deploying waterfowl decoys and particularly to waterfowl decoy deployment apparatuses having a plurality of symmetrical outwardly radiating decoy deployment arms orbiting about a central axis supported on a ground surface.

2. Discussion of the Prior Art

It is advantageous to display waterfowl decoys in the field during recreational activities such as waterfowling. The most common method of decoy deployment has for many years been to arrange multiple stationary decoys in a field. Numerous efforts have been made to animate the decoys for a more lifelike appearance such as by arranging two or more decoys around a support pole and animating the decoys.

Limitations in the art of deploying multiple decoys in a single apparatus include weight and wind conditions. If an array of multiple decoys are arranged rotationally around a support apparatus, a wobbling effect caused by imbalances in the weight of the decoys and the decoy holding arms can damage the support column and drive equipment used to rotate the array. Wind becomes a greater source of damage as the number of decoys deployed increases because more decoys will increase wind impact on the apparatus.

There is, therefore, a need in the waterfowling field for a waterfowl decoy deployment apparatus that can deploy a greater number of decoys in a rotating array than has been possible in the prior art that can withstand the added stress and potential for damage to the support equipment caused by increased weight and wind forces.

BRIEF DESCRIPTION OF THE DRAWINGS

FIGS. 9-12B show several different decoy deployment arms thereof;

DETAILED DESCRIPTION OF THE ILLUSTRATED EMBODIMENT

Figure 1:
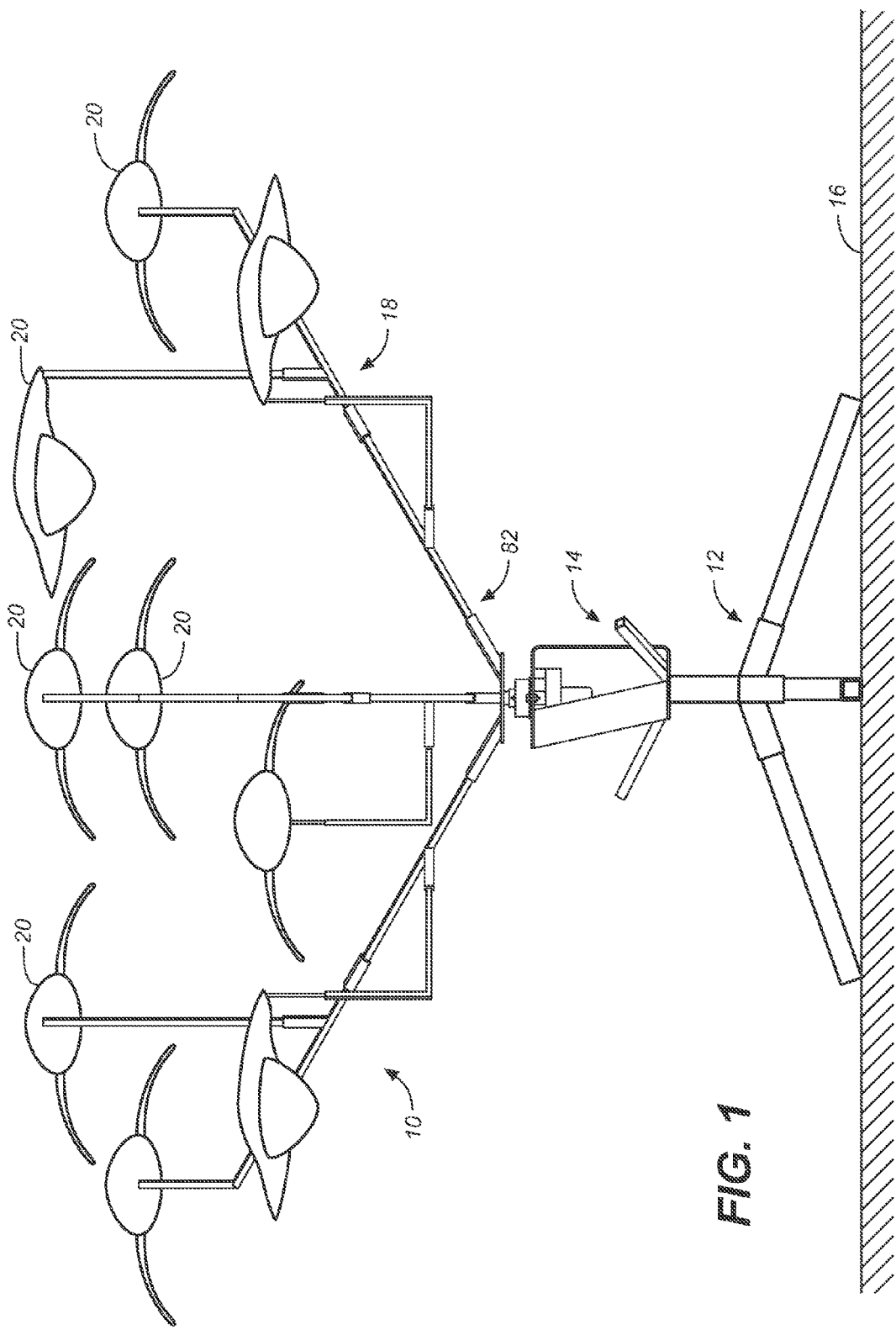
FIG. 1 is an elevation view of a waterfowl decoy deployment apparatus according to the invention.

A waterfowl decoy deployment apparatus is referred to generally at reference numeral 10 in FIG. 1. A waterfowl decoy deployment apparatus 10 comprises a stand 12, a housing 14 supported above a ground surface 16 on the stand, and an array of outwardly radiating decoy deployment arms 18 rotatably supported on the housing 14, each of the arms deploying one or more waterfowl decoys 20.

Figure 2:
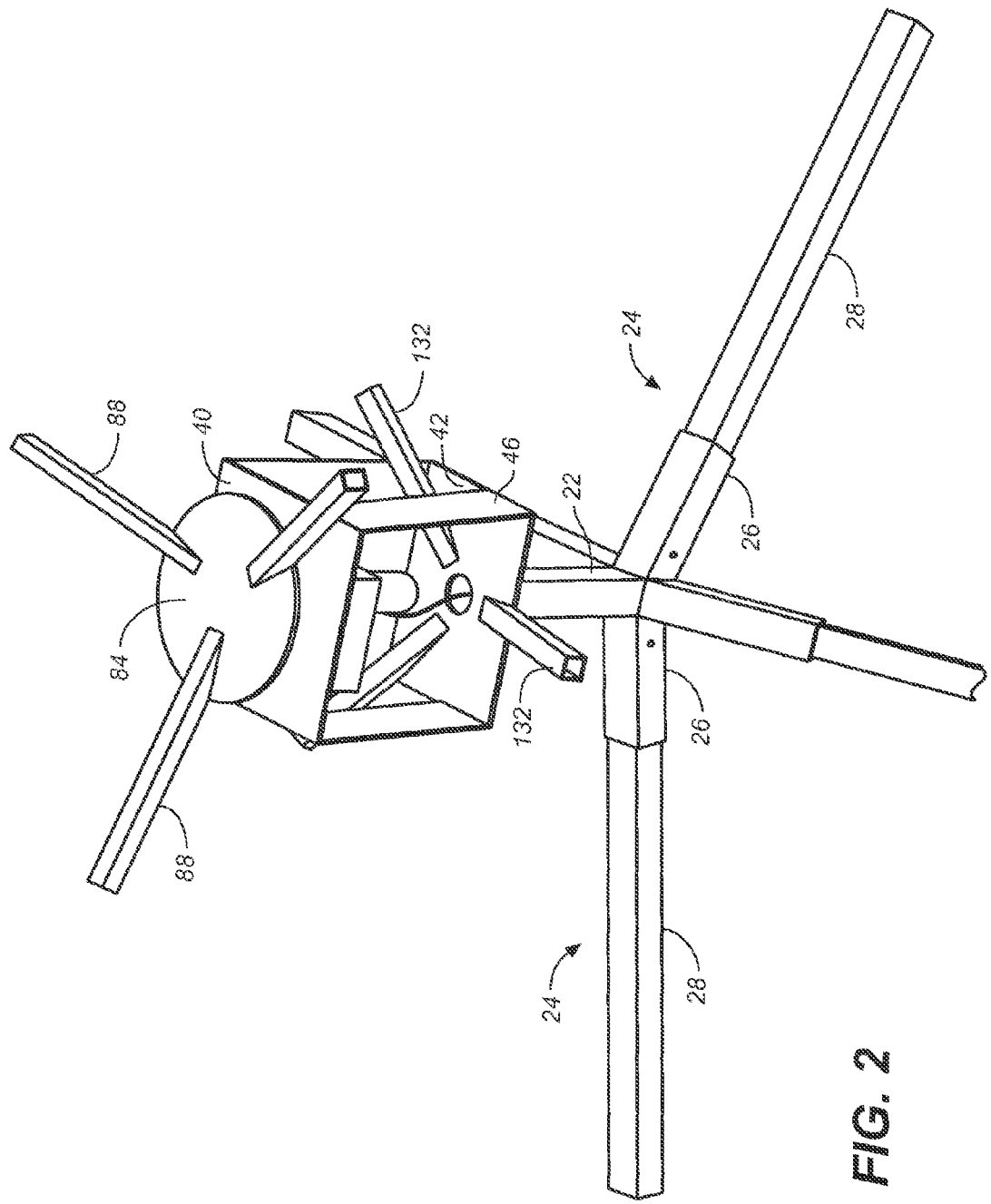
FIG. 2 is an upper perspective view of the drive wheel, housing and stand of the waterfowl decoy deployment apparatus shown in FIG. 1.
Figure 15A:
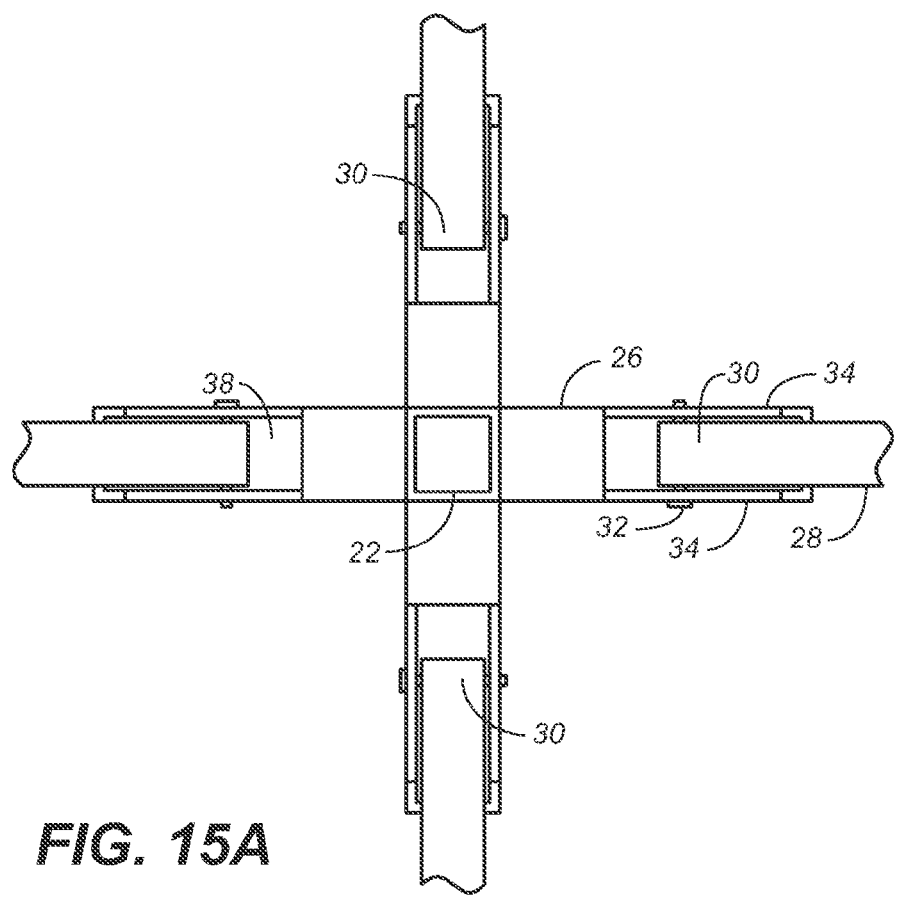
FIGS. 15A and 15B are bottom plan view of the stand thereof showing the leg extensions in splayed and stowed positions, respectively.

With reference to FIG. 2, the stand 12 includes a central support column 22 supported on four legs 24. Each leg includes a support hood 26 and a leg extension 28. With additional reference to FIGS. 15A and 15B, a proximal end 30 of each leg extension 28 is captured in the support hood 26 and is rotatable therein about a pivot pin 32 which extends between opposing side walls 34 of support hood 26. The leg extensions 28 are thus moveable between the splayed configuration, shown in FIGS. 1, 2 and 15A, and the stowed configuration, shown in FIG. 15B. In the stowed configuration, each of the leg extensions 28 is rotated about pivot axes 32 so that the bottom ends 36 thereof are centrally collected and the leg extensions 28 are generally in longitudinal alignment with the central support column 22 in a collapsed arrangement making for easy transportation and efficient storage of the apparatus.

Figure 15B:
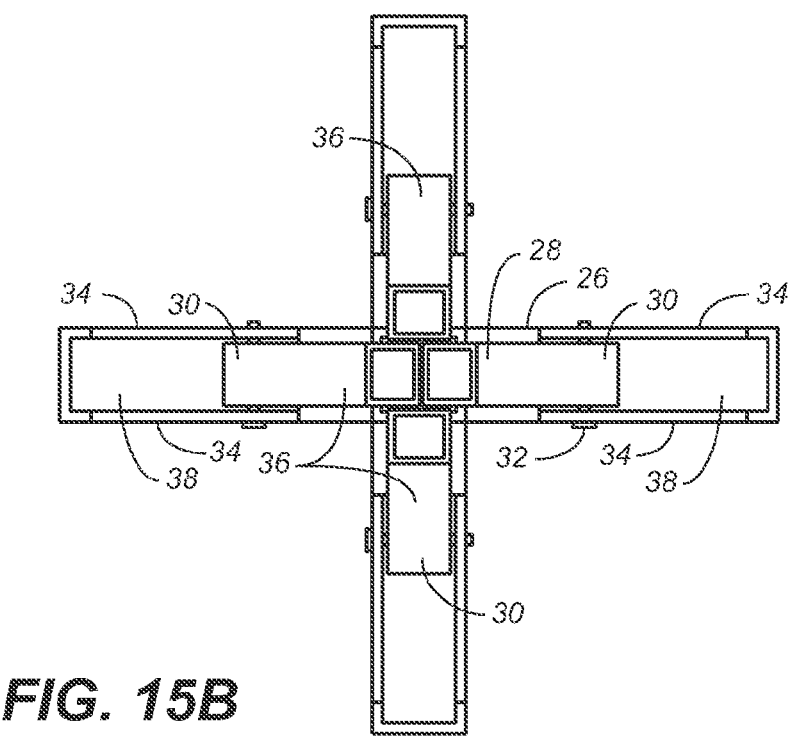

From the stowed position shown in FIG. 15B, the leg extensions 28 are moveable to the splayed position (see FIG. 15A) by outwardly and upwardly rotating leg extensions 28 until they contact the upper walls 38 of support hoods 26.

Figure 3:
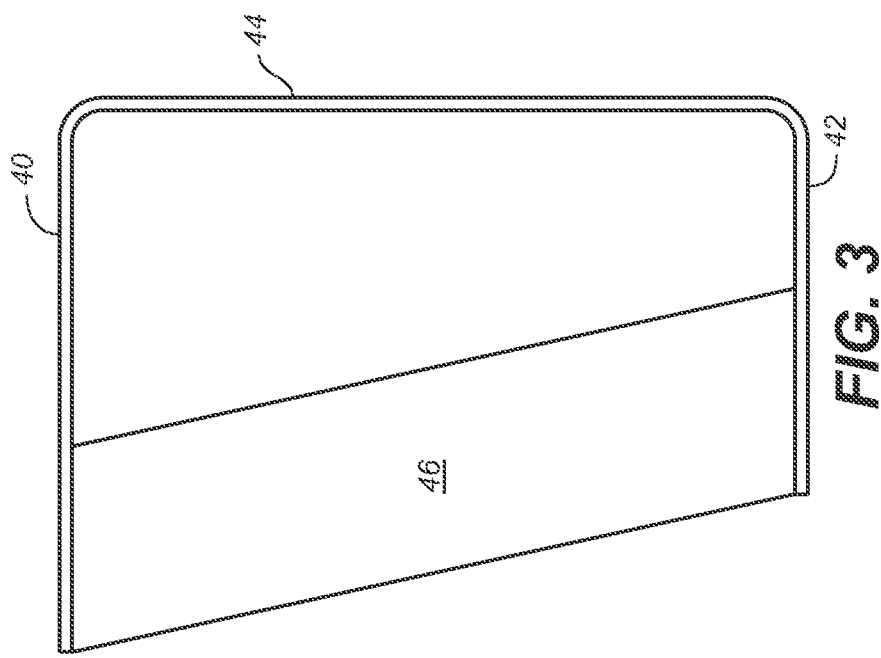
FIG. 3 is a side elevation view of the housing thereof.

Referring again to FIGS. 1 and 2, it is seen that housing 14 is supported on the central support column 22 of stand 12. As shown in FIG. 3, the housing 14 includes horizontal top and bottom plates, 40, 42 connected by vertical wall 44. Side beams 46 extending between top and bottom plates 40, 42 reinforce and strengthen the housing 14.

Figure 4:
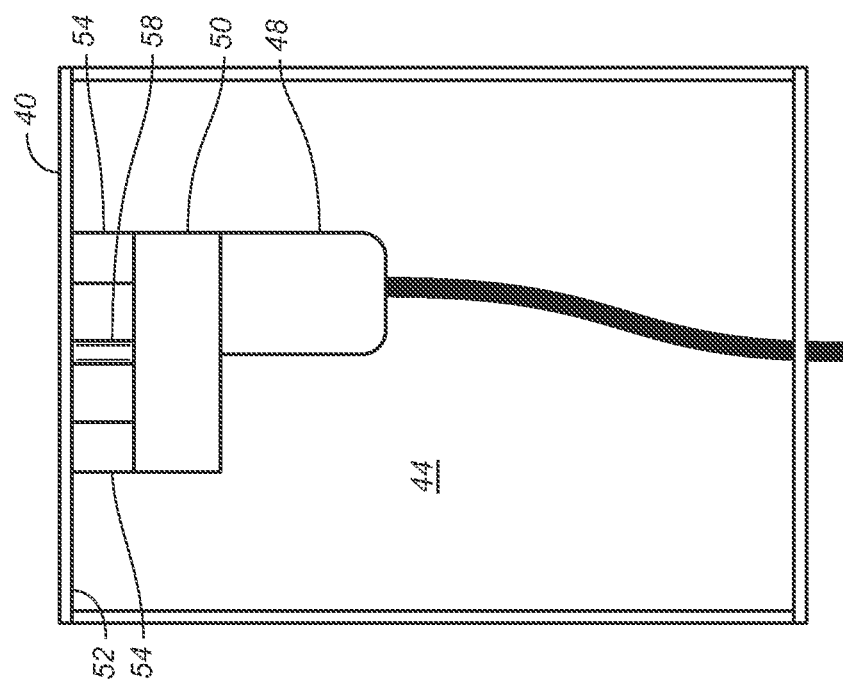
FIG. 4 is a front elevation view of the housing shown in FIG. 3.
Figure 5B:
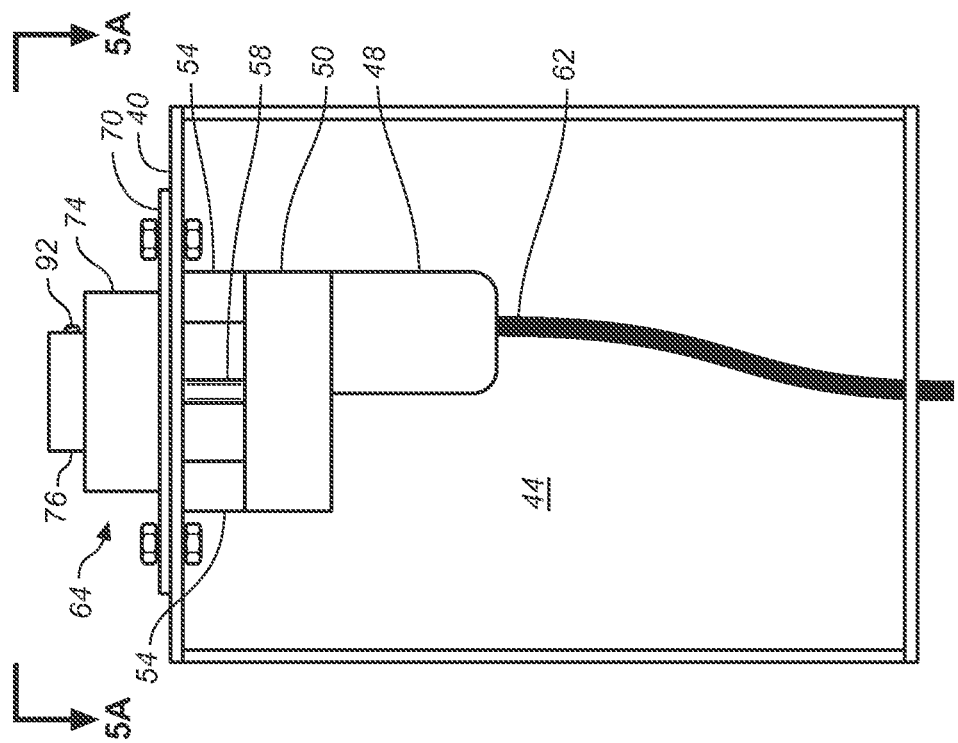
FIG. 5A and 5B are top plan and side elevations views, respectively, of the housing and a reinforcement bearing assembly thereof.
Figure 6:
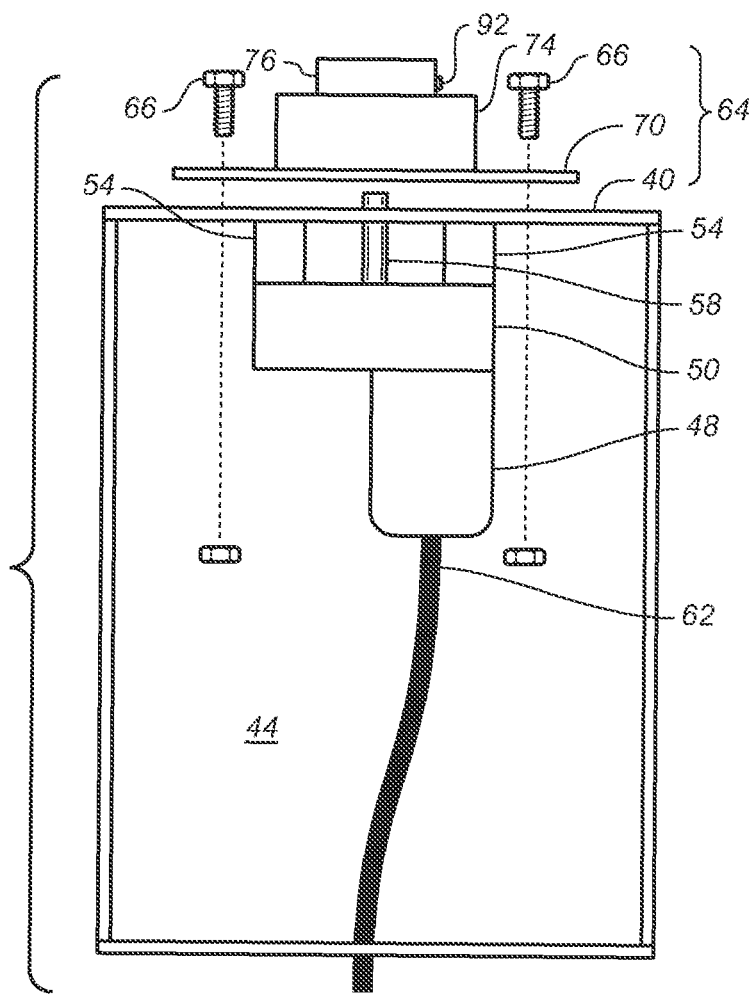
FIG. 6 is an exploded side elevation view of the housing and reinforcement bearing assembly shown in FIG. 5B.
Figure 14:
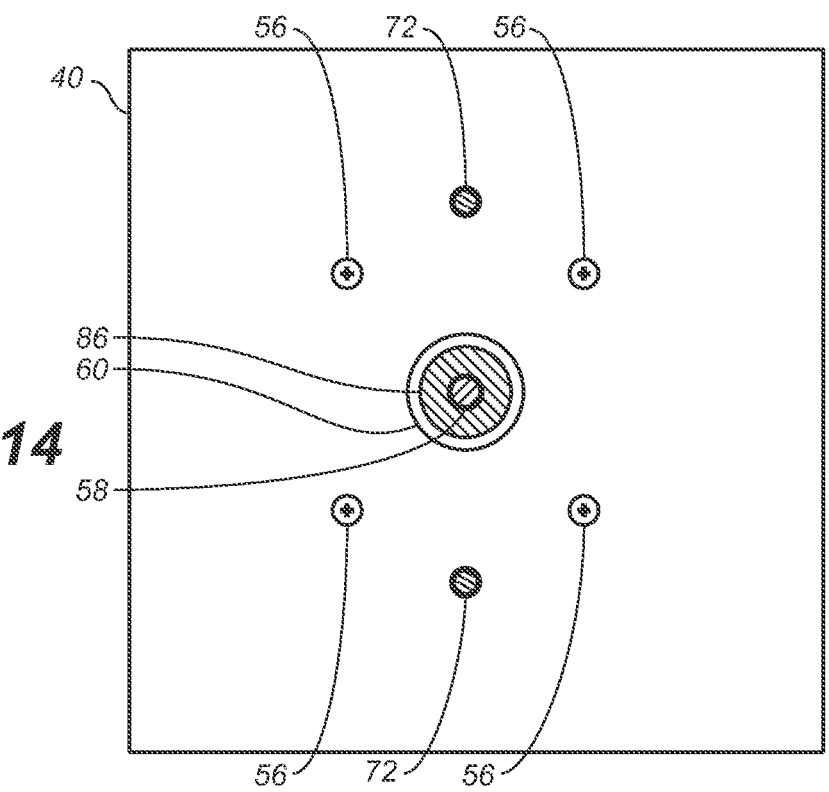
FIG. 14 is a top sectional view of the top plate of the housing thereof taken along lines 14-14 of FIG. 16.

A motor 48 and gear box 50 are attached to the underside 52 of top plate 40 as seen in FIGS. 4, 5B and 6. Suitable motors include Dayton® 2L010, 1LPV5, 1Z822 and 1Z820 DC gear motors, depending on the number of decoy deployment arms in use, as discussed below, available from Dayton Electric Manufacturing Co., located in Lake Forest, Ill. The gear box 50 is spaced from the top plate 40 by spacers 54. The spacers 54, gear box 50 and motor 48 are affixed to the top plate 40 with fasteners 56 shown in FIG. 14. A motor shaft 58 extends upwardly from the gear box 50 into bearing hole 60. A power cable 62, leads to a power source.

Figure 5A:
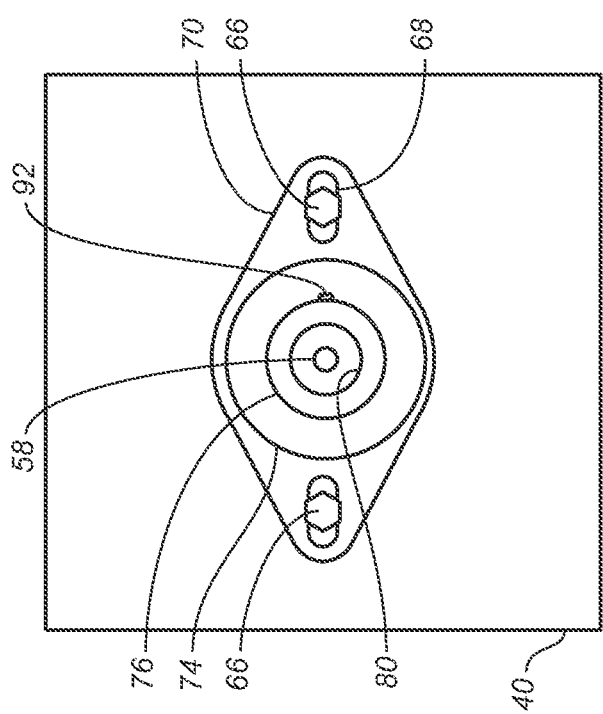

Referring next to FIGS. 5A, 5B, 6, 13, 14, 16 and 17 a reinforcement bearing assembly 64 is affixed to the top plate 40 of the housing with fasteners 66. The fasteners 66 pass through oblong fastener openings 68 in integral attachment plate 70 and are received in fastener holes 72 in top plate 40. The reinforcement bearing assembly 64 includes a bearing cage 74 in which a bearing or reinforcing collar 76 is rotatably secured with ball bearings 78. Applicant has identified the Dayton® Model 4X729 ball bearing available from Dayton Electric Manufacturing Co. as a suitable ball bearing for use in the reinforcement bearing assembly. With particular reference to FIG. 5A, the bearing 76 includes a drive shaft bore 80 that is concentrically aligned with the motor shaft 58.

Figure 7:
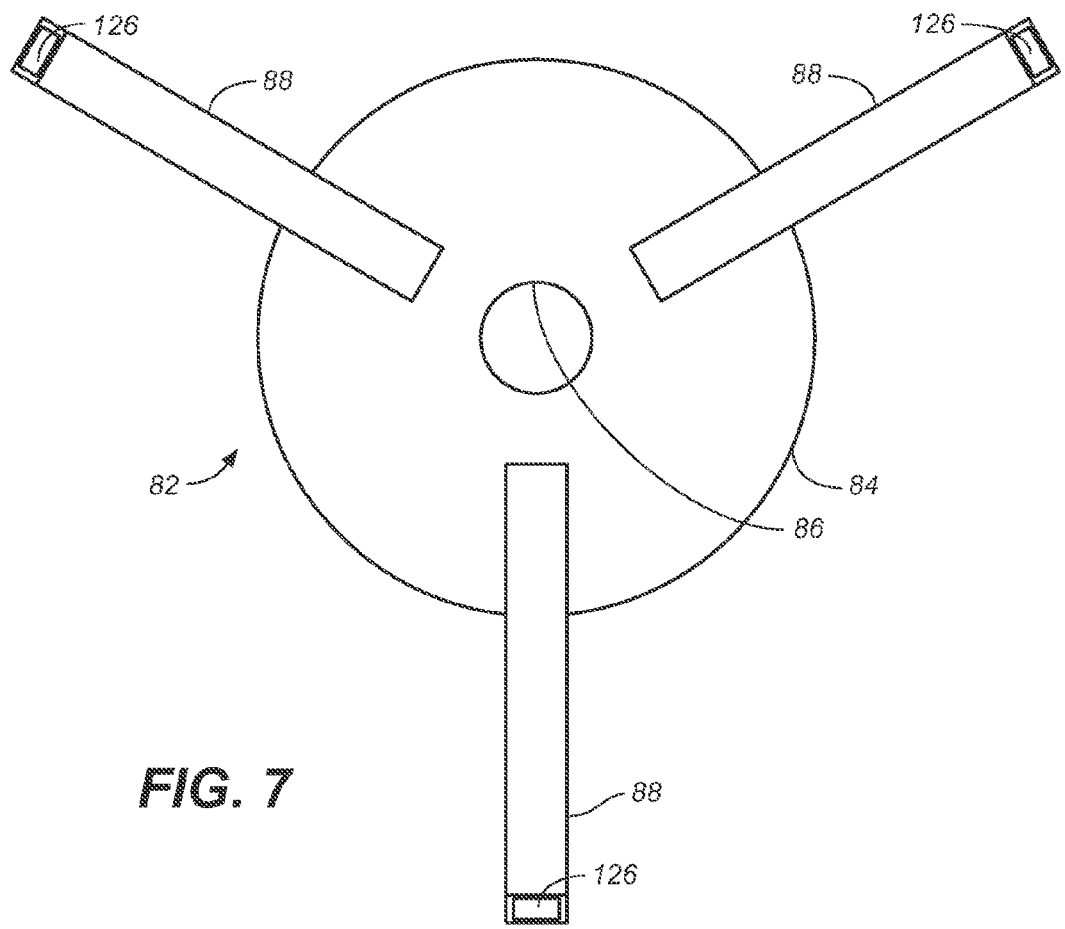
FIG. 7 is a top plan view of the support plate and holding arms of the drive wheel of the waterfowl decoy deployment apparatus shown in FIG. 1.
Figure 8:
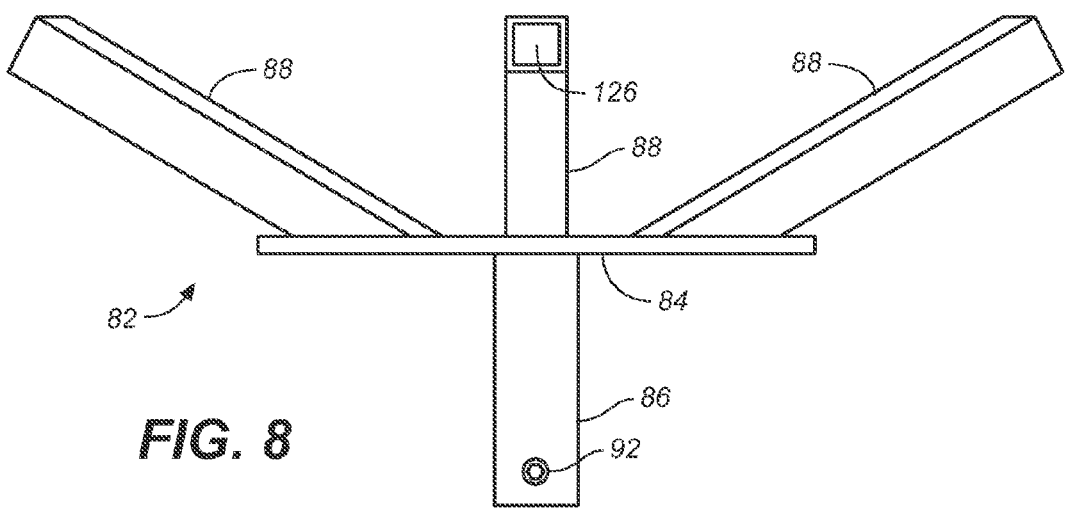
FIG. 8 is a side elevation view of the drive wheel thereof.
Figure 13:
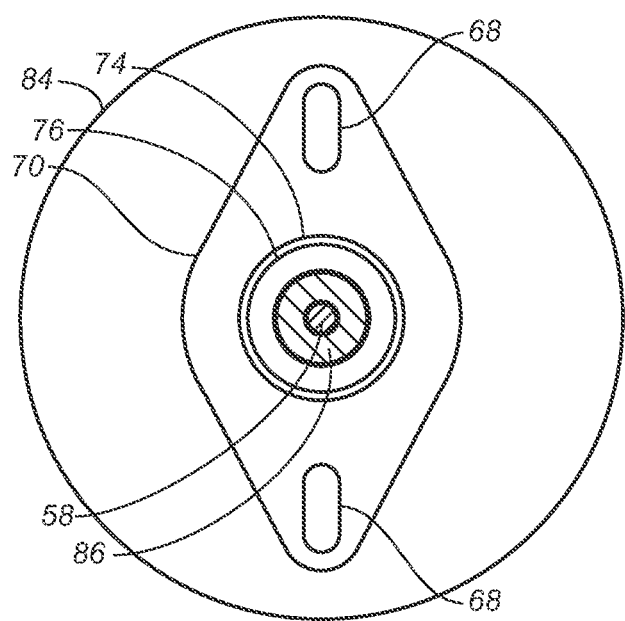
FIG. 13 is a simplified sectional view of the bottom of the reinforcement bearing assembly and the support disk of the drive wheel taken along lines 13-13 of FIG. 16.
Figure 17:
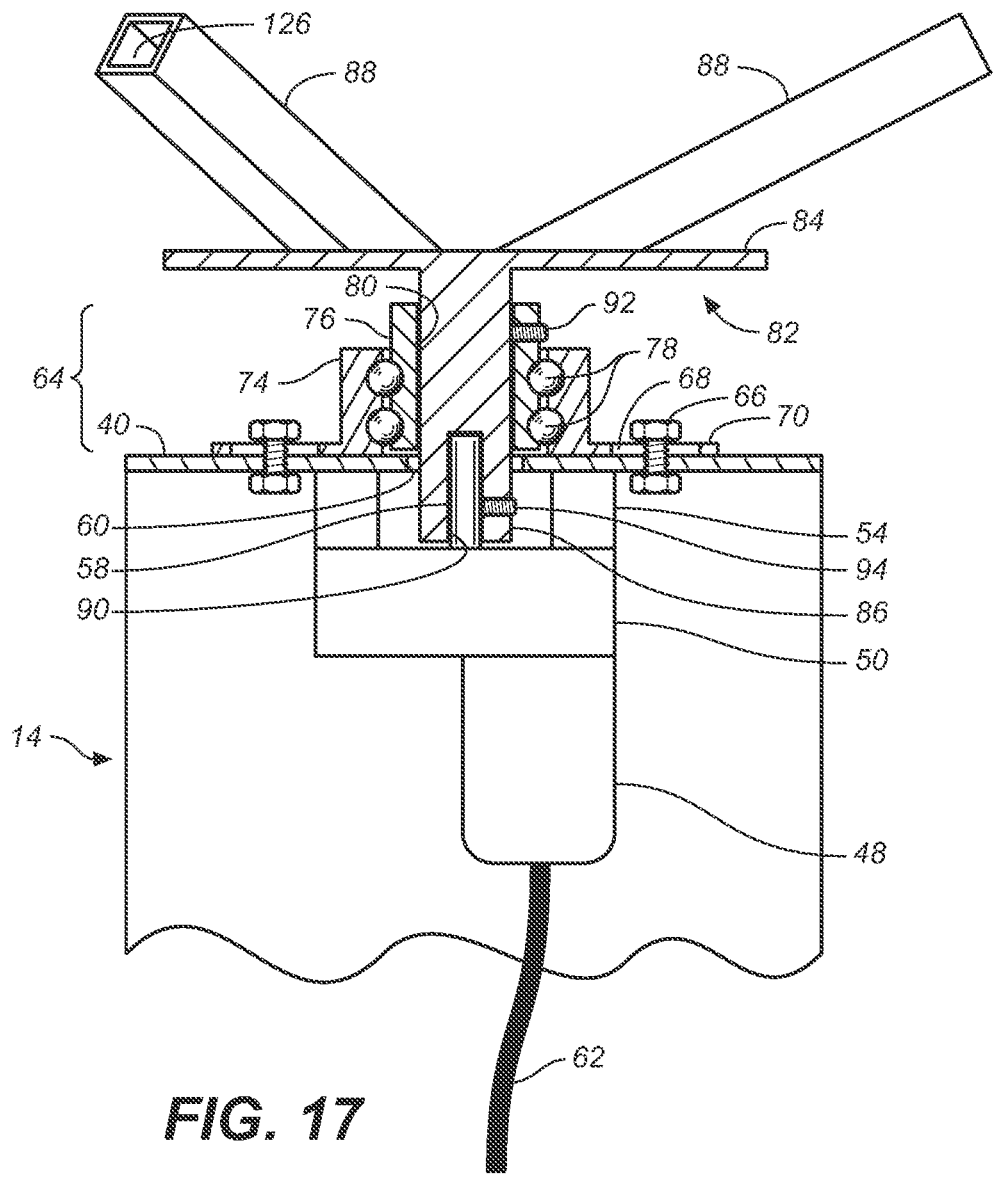
FIG. 17 is a close up sectional view of the drive wheel, reinforcement bearing assembly, motor and gearbox thereof, taken along lines 17-17 of FIG. 16.

With reference again to FIG. 1, it is seen that the array of decoy deployment arms 18 are supported by and extend from a drive wheel 82. As shown in FIGS. 7 and 8, drive wheel 82 includes a support plate 84, a drive shaft 86 depending from the support plate 84, and a plurality of holding arms 88 secured to and extending outwardly at an upward angle from support plate 84. As shown in FIG. 17, when the drive wheel 82 is assembled with the housing 14 and reinforcing bearing assembly 64, drive shaft 86 is received in the drive shaft bore 80 of reinforcing collar 76 and is freely received in drive shaft opening 60 in the top plate 40 of housing 14, and motor shaft 58 is received in a motor shaft bore 90 in the lower end of the drive shaft 86. The reinforcing collar 76 is fixed to the drive shaft 86 of the drive wheel 82 with a set screw 92, and the drive shaft 86 is in turn fixed to the motor shaft 58 with set screw 94, such that activation of motor 48 causes motor shaft 58, drive shaft 86, reinforcing collar 76 and drive wheel 82 to rotate in unison.

Each of the decoy deployment arms 18 is comprised of a plurality of sections shown in FIGS. 9-12. Each section may include one or more body segments, one or more receiving parts, an insert end, and a decoy attachment end. FIG. 9 shows a straight body segment 96 having an insert end 98 and a receiving portion 100. FIG. 10 shows a body segment 102 having an insert end 104, a receiving portion 106 extending at an acute angle from the distal end 109 of body segment 102, and a decoy attachment end 108 extending angularly from the body segment 102. FIG. 11 shows a body segment 110 having an insert end 112, a receiving end 114, and a receiving portion 116, extending perpendicularly from the body segment 110. Finally, FIG. 12 shows a decoy deploying arm 119 having two body segments 118, 120 connected perpendicularly, an insert end 122 and a decoy deployment end 124. Similarly, with reference to FIGS. 7, 8, 16 and 17, the end of each of the holding arms 88 has a decoy arm receiving aperture 126. Each of the insert ends 98, 104, 112, 120 of each of the decoy deployment arms fits snugly in any of the receiving parts 100, 106, 114, 116 of any of the other arms and in the decoy arm receiving apertures 126 of the holding arms 88 so that the sections may be assembled in an array radiating outwardly from the support plate 84 of the drive wheel 82 as shown in FIG. 1.

The embodiment illustrated in FIG. 1 shows three decoy deployment arms deploying three decoys each, for a total of nine decoys. It will be understood that fewer or a greater number of decoy arms may be put into use. For example, a waterfowl decoy deployment apparatus according to the invention may include four or five decoy deployment arms, may have a vertically arranged plurality of stacks of decoy deployment arms, and may put in play six, nine, twelve, twenty-four, forty, or another plurality of decoys.

As seen in FIGS. 12A and 12B, the decoy deployment end 124 of the decoy deploying arm 119 includes a support rod receiving bore 128 and a locking fastener 130 for holding the support rod of a waterfowl decoy in the receiving bore. A waterfowl decoy suitable for use with the waterfowl decoy deployment apparatus is the flying bird replica disclosed in U.S. Pat. No. 8,151,512 to Latschaw, which is incorporated herein by reference. Latschaw describes a waterfowl decoy supported by a support rod having horizontal and vertical sections. Insertion of the vertical section of the Latschaw support rod in the support rod-receiving bore 128 of the waterfowl decoy deployment apparatus will enable deployment of a plurality of waterfowl decoys in a spinning arrangement that presents a lifelike imitation of the natural activity of waterfowl. Those of skill in the art will understand that other waterfowl decoys may be used with the present invention.

Figure 16:
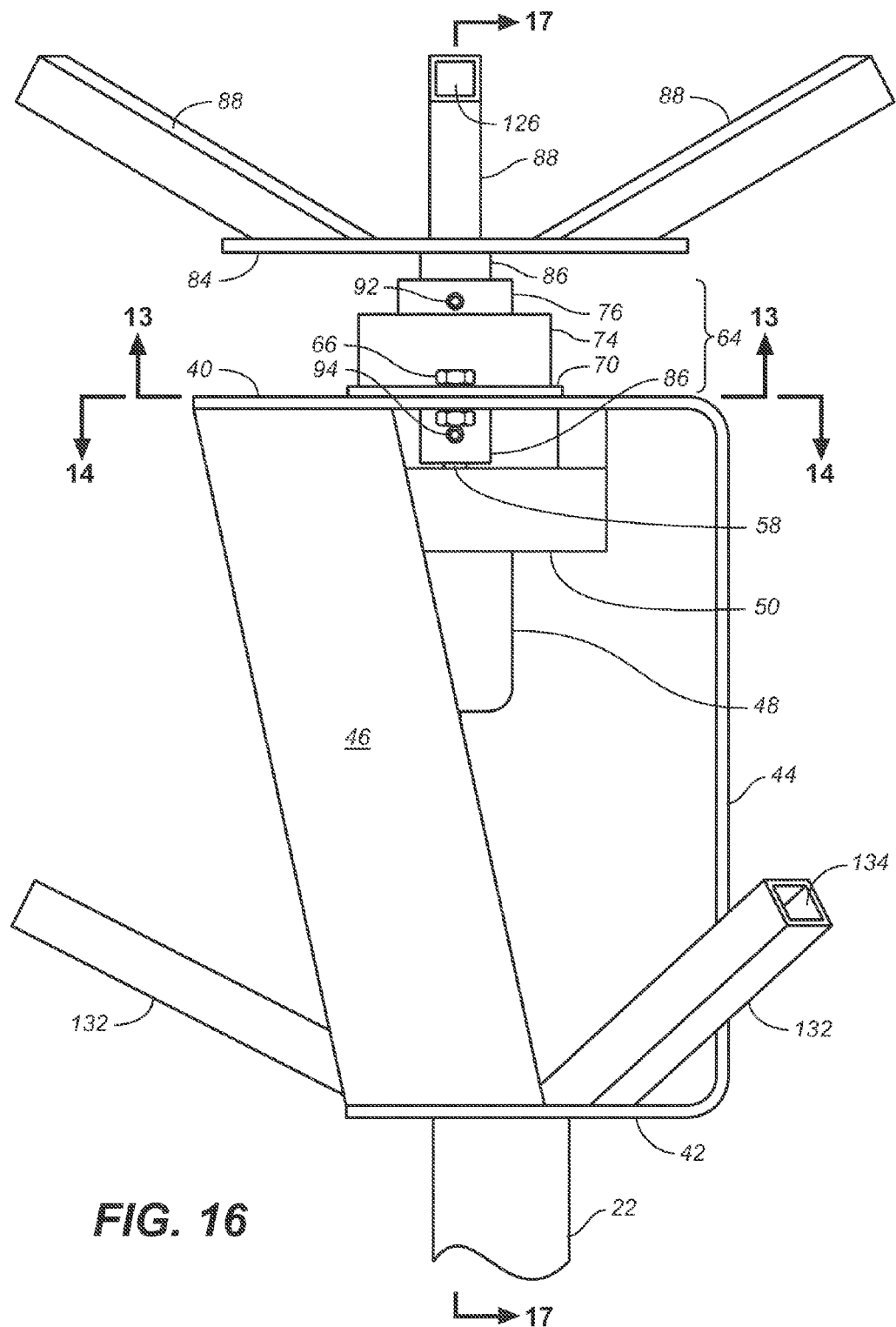
FIG. 16 is a side elevation view of the housing, drive wheel and reinforcement bearing assembly thereof.

Finally, as seen in FIGS. 1, 2 and 16, stationary holding arms 132, similar to holding arms 88, are attached to and radiate outward at an upward angle from the bottom plate 42 of housing 14, each arm 132 having a decoy arm receiving aperture 134 for holding additional waterfowl decoy deployment arms.

The reinforcing bearing assembly provides robust lateral support for the drive shaft of the drive wheel which, in combination with the sturdy stand upon which the housing is supported, enables the device to accommodate lateral forces bearing on the decoy deployment arms caused by wind and wobbling that may occur from non-symmetrical weighing of the arms. A waterfowl decoy deployment apparatus according to the invention is, therefore, able to deploy a greater number of decoy holding arms and a greater number of waterfowl decoys for a lifelike presentation.

There have thus been described and illustrated certain embodiments of a waterfowl decoy deployment apparatus according to the invention. Although the present invention has been described and illustrated in detail, it should be clearly understood that the disclosure is illustrative only and is not to be taken as limiting, the spirit and scope of the invention being limited only by the terms of the appended claims and their legal equivalents.

I claim:

1. A waterfowl decoy deployment apparatus comprising:
    a stand,
    a housing supported above a ground surface on said stand, said housing including a horizontal top plate having a drive shaft opening,
    a motor secured to the top plate of said housing, said motor having an upwardly extending motor shaft,
    a bearing cage secured to the top plate of said housing,
    a reinforcement collar rotatably secured in said bearing cage, said reinforcement collar having a drive shaft bore,
    a drive wheel having a support plate and a drive shaft depending from said support plate, said drive shaft having a lower end both freely received in the drive shaft opening of and extending through the top plate of the housing, said lower end including a motor shaft bore, said drive shaft both received in the drive shaft bore of and fixed to said reinforcement collar such that said reinforcement collar rotates in unison with said drive shaft, said motor shaft both received in the motor shaft bore of and fixed to said drive shaft, and
    an array of decoy deployment arms radiating symmetrically from the support plate of said drive wheel for deployment of waterfowl decoys,
    such that activation of said motor causes the motor shaft, drive wheel, reinforcement collar and decoy deployment arms to rotate, and that during rotation thereof said reinforcement collar provides lateral support for the drive shaft of said drive wheel.

2. The waterfowl decoy deployment apparatus of claim 1 further comprising:
    the top plate of said housing including a lower surface,
    a plurality of spacers interposed between said lower surface and said motor, such that said motor is spaced from said lower surface.

3. The waterfowl decoy deployment apparatus of claim 1 wherein:
    said housing includes a bottom plate spaced from said top plate, and
    said stand is affixed to said bottom plate.

4. The waterfowl decoy deployment apparatus of claim 1 further comprising:
a plurality of waterfowl decoys, each decoy having a support rod,
said decoy deployment arms each having one or more distal ends for deployment of waterfowl decoys, and
each of the distal ends of each arm of said array of arms including a rod-receiving bore for receiving one of said support rods.

5. The waterfowl decoy deployment apparatus of claim 1 further comprising:
a fastener opening in said reinforcement collar,
a set screw threadedly received in said fastener opening which, when tightened, engages said drive shaft for securing said reinforcement collar thereto.

6. The waterfowl decoy deployment apparatus of claim 1 wherein:
said reinforcement collar extends above said bearing cage.

7. The waterfowl decoy deployment apparatus of claim 1 further comprising:
said decoy deployment arms each having one or more distal ends for deployment of waterfowl decoys.

8. The waterfowl decoy deployment apparatus of claim 1 further comprising:
a plurality of ball bearings interposed between said reinforcement collar and said bearing cage.

9. The waterfowl decoy deployment apparatus of claim 1 further comprising:
the support plate of said drive wheel having a planar top surface, and
each of the decoy deployment arms in said array thereof is disposed at an acute angle to said top surface.

10. A waterfowl decoy deployment apparatus comprising:
a stand,
a housing supported above a ground surface on said stand, said housing including a horizontal top plate having a drive shaft opening,
a motor secured to the top plate of said housing, said motor having an upwardly extending motor shaft,
a bearing cage secured to the top plate of said housing, the top plate of said housing including a lower surface, a plurality of spacers interposed between said lower surface and said motor, such that said motor is spaced from said lower surface,
a reinforcement collar rotatably secured in said bearing cage, said reinforcement collar having a drive shaft bore,
a drive wheel having a support plate and a drive shaft depending from said support plate, said drive shaft having a lower end both freely received in the drive shaft opening of and extending through the top plate of said housing, said lower end including a motor shaft bore and an aperture disposed between the lower surface of said top plate and said motor, said motor shaft received in said motor shaft bore, a fastener received in said aperture and engaged with said motor shaft for fixing said motor shaft to said drive shaft, said drive shaft both received in the drive shaft bore of and fixed to said reinforcement collar such that said reinforcement collar rotates in unison with said drive shaft, and
an array of decoy deployment arms radiating symmetrically from the support plate of said drive wheel, said decoy deployment arms each having one or more distal ends for deployment of waterfowl decoys,
such that activation of said motor causes the motor shaft, drive wheel, reinforcement collar and decoy deployment arms to rotate, and that during rotation thereof said reinforcement collar provides lateral support for the drive shaft of said drive wheel.

11. A waterfowl decoy deployment apparatus comprising:
a stand including a center support column and a plurality of legs, said support column having a top end and a bottom end, said plurality of legs extending radially from said bottom end,
each of said legs having a support hood and a leg extension, said support hood attached to and extending outwardly from said support column, said support hood having two side walls, a top wall bridging said side walls, and a pivot pin extending between said side walls, each leg extension having a proximal end captured by said pivot pin between said side walls and moveable about said pivot pin between collapsed and splayed positions, in said collapsed position said legs disposed substantially in longitudinal alignment with said support column, and in said splayed position said legs extended outwardly from said support column wherein upward rotation of said legs is limited by engagement of said leg with the top wall of said support hood,
a housing supported above a ground surface on said stand, said housing including a horizontal top plate having a drive shaft opening, said housing supported on said top end of said support column,
a motor secured to the top plate of said housing, said motor having an upwardly extending motor shaft,
a bearing cage secured to the top plate of said housing,
a reinforcement collar rotatably secured in said bearing cage, said reinforcement collar having a drive shaft bore,
a drive wheel having a support plate and a drive shaft depending from said support plate, said drive shaft having a lower end both freely received in the drive shaft opening of and extending through the top plate of said housing, said lower end including a motor shaft bore, said drive shaft both received in the motor shaft bore of and fixed to said reinforcement collar such that said reinforcement collar rotates in unison with said drive shaft, said motor shaft both received in the motor shaft bore of and fixed to said drive shaft, and
an array of decoy deployment arms radiating symmetrically from the support plate of said drive wheel, said decoy deployment arms each having one or more distal ends for deployment of waterfowl decoys,
such that activation of said motor causes the motor shaft, drive wheel, reinforcement collar and decoy deployment arms to rotate, and that during rotation thereof said reinforcement collar provides lateral support for the drive shaft of said drive wheel.

12. A waterfowl decoy deployment apparatus comprising:
a stand including a center support column and a plurality of legs, said support column having a top end and a bottom end, said plurality of legs extending radially from said bottom end,
each of said legs having a support hood and a leg extension, said support hood attached to and extending outwardly from said support column, said support hood having two side walls, a top wall bridging said side walls, and a pivot pin extending between said side walls, each leg extension having a proximal end captured by said pivot pin between said side walls and moveable about said pivot pin between collapsed and splayed positions, in said collapsed position said legs disposed substantially in longitudinal alignment with said support column, and in said splayed position said legs extended outwardly from said support column wherein upward rotation of said legs is limited by engagement of said leg with the top wall of said support hood, a housing supported above a ground surface on said stand, said housing including a horizontal top plate having a drive shaft opening, said housing supported on said top end of said support column, a motor secured to the top plate of said housing, said motor having an upwardly extending motor shaft, a reinforcement bearing assembly having a bearing cage and a bearing, said bearing cage secured to the top plate of said housing, said bearing rotatably secured in said bearing cage, said bearing having a center aperture, a drive wheel having a support plate and a drive shaft depending from said support plate, said drive shaft having a lower end including a center bore, said drive shaft both received in the center aperture of and secured to said bearing, said motor shaft both received in the center bore of and secured to said drive shaft, and an array of decoy deployment arms radiating symmetrically from the support plate of said drive wheel, said decoy deployment arms each having one or more distal ends for deployment of waterfowl decoys, such that activation of said motor causes the motor shaft, drive wheel, bearing and decoy deployment arms to rotate, and that during rotation thereof said reinforcement bearing assembly provides lateral support for the drive shaft of said drive wheel.

\* \* \* \* \*